United States Patent
Morales et al.

(10) Patent No.: US 6,192,821 B1
(45) Date of Patent: Feb. 27, 2001

(54) BOAT MOUNTED HYDRO-ALTERNATOR

(75) Inventors: Robert Luke Morales; Andrew John Kruse, both of Flagstaff, AZ (US)

(73) Assignee: Robert Morales, Flagstaff, AZ (US)

( * ) Notice: Subject to any disclaimer, the term of this patent is extended or adjusted under 35 U.S.C. 154(b) by 0 days.

(21) Appl. No.: 09/039,469

(22) Filed: Mar. 16, 1998

(51) Int. Cl.[7] .............................. B63B 8/00; B60L 11/02; B63H 9/00
(52) U.S. Cl. .................................. 114/343; 440/6; 440/8
(58) Field of Search ..................... 440/8, 3, 79, 6; 114/343, 156; 310/40 R, 42, 43, 52, 215, 266; 290/43, 44, 55, 54

(56) References Cited

U.S. PATENT DOCUMENTS

| | | |
|---|---|---|
| 499,780 | 6/1893 | Corning . |
| 1,898,973 | 2/1933 | Lansing . |
| 3,064,137 * | 11/1962 | Corbett, Jr. et al. ............ 290/53 |
| 3,238,911 * | 3/1966 | Paxulski ........................... 114/39 |
| 3,619,632 | 11/1971 | Labombarde . |
| 3,703,642 | 11/1972 | Balaguer . |
| 3,812,379 | 5/1974 | Kaufman et al. . |
| 3,881,443 * | 5/1975 | Hamp .............................. 115/18 |
| 4,102,291 | 7/1978 | Sebald . |
| 4,228,362 * | 10/1980 | Jacobs et al. .................... 290/44 |
| 4,738,644 * | 4/1988 | Happel ............................. 440/90 |
| 4,924,125 * | 5/1990 | Clark ............................... 310/67 |
| 5,140,292 * | 8/1992 | Aronow .......................... 336/205 |
| 5,150,859 * | 9/1992 | Ransick .......................... 244/58 |
| 5,261,842 | 11/1993 | Hinkel, Jr. . |
| 5,446,324 * | 8/1995 | Onodera ......................... 310/45 |
| 5,506,453 * | 4/1996 | McCombs ...................... 290/44 |
| 5,760,515 * | 6/1998 | Burns ............................. 310/115 |

FOREIGN PATENT DOCUMENTS 2908-133    11/1980   (DE) .

* cited by examiner

Primary Examiner—Russell D. Stormer
Assistant Examiner—Patrick Craig Muldoon
(74) Attorney, Agent, or Firm—John VandenBosche

(57) ABSTRACT

A hydro-alternator for attachment to the outboard motor on a bass fishing boat. The hydro-alternator generates electrical power for charging of batteries on the boat. The alternator charges the batteries while the boat is being propelled by its large outboard motor. The alternator is designed to provide high power, high current, and low drag force. To achieve this, it has a compact design in order to project a small profile. It also turns at very high rotational speeds in order to achieve adequately high power and current output.

20 Claims, 3 Drawing Sheets

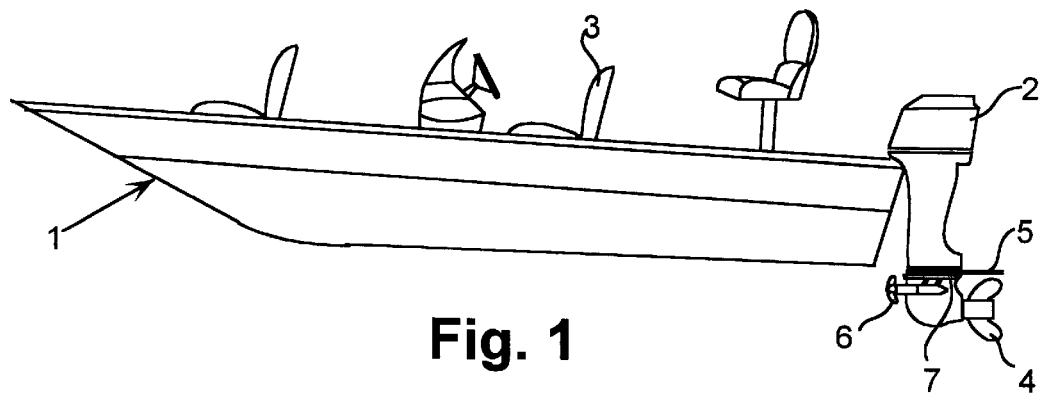
Fig. 1
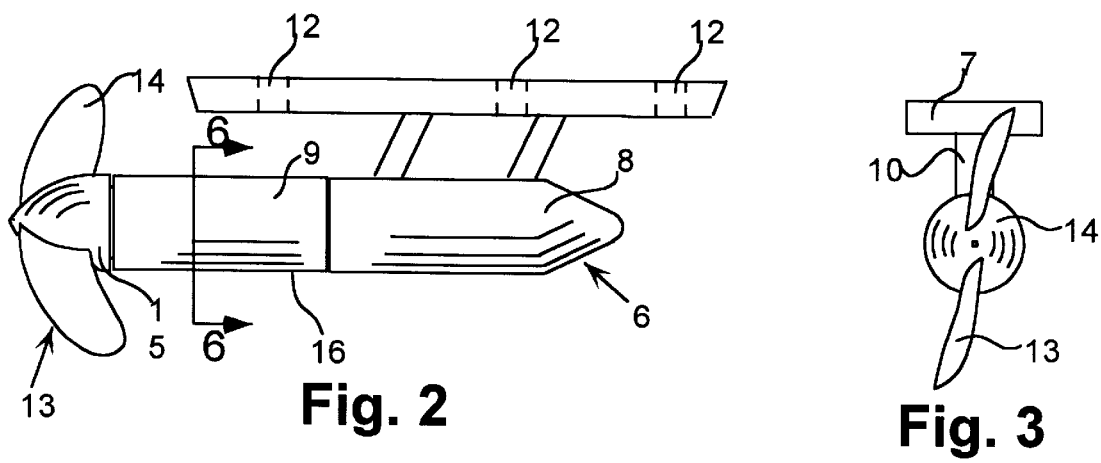
Fig. 2
Fig. 3
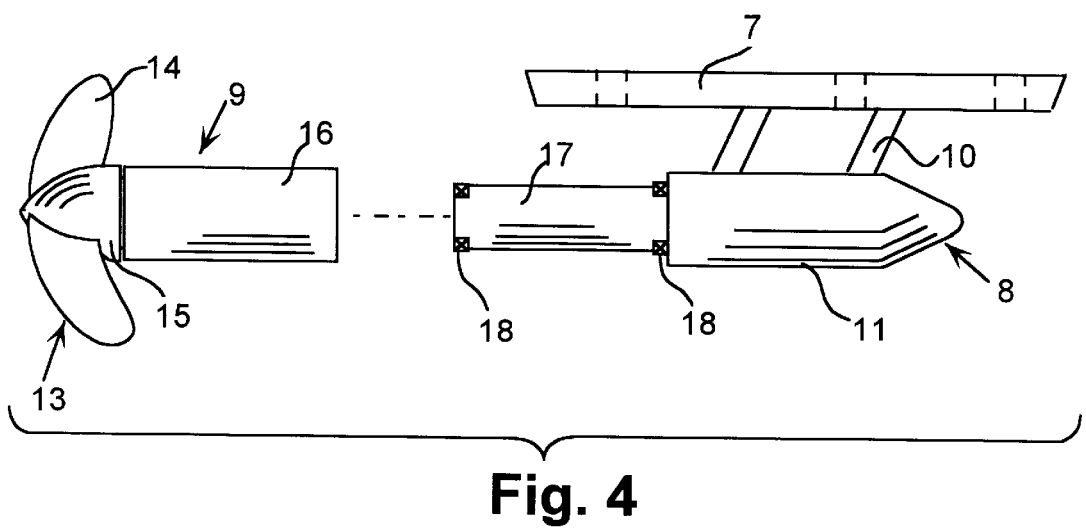
Fig. 4

BOAT MOUNTED HYDRO-ALTERNATOR

BACKGROUND OF THE INVENTION

This invention relates to an electrical alternator for use on a boat. Specifically, the invention relates to a compact, low drag alternator to be used on a high speed boat for charging batteries.

Modern bass fishing boats are very sophisticated, high performance water craft. They are designed to provide the maximum amount of fishing time in a day. Bass fishing tournaments are popular events, often with large monetary prizes to the winner of the tournament. Therefore, bass fishermen are willing to pay large amounts of money for an optimized boat that can give them a competitive advantage in tournaments.

Typical bass fishing boats are designed to go from the dock to the fishing location as quickly as possible, and then to slowly troll at the fishing location using an electric trolling motor. To go to the fishing location quickly, they have a sleek, hydrodynamic hull and a powerful outboard gasoline engine. Often the boats will have engines approaching 300 horsepower, and are capable of traveling at speeds up to 80 miles per hour. Once at the fishing location, such a high powered engine is clearly not needed. The large gasoline powered outboard motors used on bass fishing boats are usually not capable of propelling the boat at the slow speeds required for trolling. Also, the noise from the gasoline engine generally scares the fish away and is detrimental to fishing success. Therefore, all bass fishing boats are equipped with a small auxiliary trolling motor. The auxiliary trolling motor is usually electrically powered and very quiet.

In order to power the electrical trolling motor it is necessary to carry a bank of batteries on the boat. The amount of time that can be spent fishing is often limited by the energy available in the batteries. Once the batteries have been depleted, it is not possible to use the trolling motor and the day of fishing is over. So while fishermen are willing to spend large amounts of money for a high performance boat and engine to get them to and from their fishing location, the actual time that they can spend fishing is often limited by the electrical energy available for their small trolling motor.

The only way to extend the charge time of the batteries for the trolling motor is to carry extra batteries. Because batteries are large and heavy, it is not practical to carry more than 4 or 5 batteries. Most boats carry 3 batteries. When the batteries on board the boat are depleted, it is necessary to return to the dock to recharge the batteries, or at least to swap out the batteries for a fresh set. During a fishing tournament, this lost fishing time for charging or exchanging the batteries could mean the difference between winning or losing the tournament. Therefore, it would be desirable to provide a method of charging the batteries for the trolling motor during a fishing trip without the need to return to the dock.

Alternators are commercially available on the drive train of the large gasoline powered outboard engine for bass fishing boats. However, the available alternators are only intended to provide electrical energy to charge the starting battery and for operating onboard electrical equipment such as radios, lights, and miscellaneous electronic instrumentation. The available alternators are generally not big enough to adequately charge the batteries for the trolling motor. Most boats have only a 24 amp alternator, whereas a 45–60 amp alternator would be required to adequately charge the trolling batteries. Furthermore, the latest trolling motors operate on a 24 to 48 VDC electrical system, whereas the alternators found in all outboard engines are only capable of charging a 12 VDC electrical system.

Several battery chargers are described in the prior art. The prior art battery chargers are not suitable for use on high performance, high speed bass fishing boats. The prior art includes several battery charging alternators that are powered by a propeller. However, the prior art devices are designed for use on slow moving boats such as sail boats or low powered motor boats. The prior art devices are characterized by relatively large, slow turning propellers. The prior art devices would cause unreasonable drag forces on the boat when traveling at high speed. Also, the prior art devices all utilize direct current generators. DC generators are generally not well suited for use in a hydro-alternator on a fast moving boat because they tend to be large and relatively inefficient.

SUMMARY OF THE INVENTION

According to the present invention, a bass style fishing boat is provided with a hydro-powered alternator. The hydro-alternator of the present invention is a compact, highly efficient device that provides maximum battery charging power while adding minimal drag to the boat. The hydro-alternator of the present invention achieves the desired results of high efficiency, maximum power, and minimal drag by employing a design that has a small propeller that turns at high rotational speed. The alternator's performance is enhanced by allowing good heat transfer between electrical components, which can become hot, and the water, which is generally at a relatively low temperature.

The hydro-alternator is essentially made in a two-part construction. It has a stationary body that is mounted to the boat, and a rotor that mounts onto the stationary body and that turns together with a propeller. The stationary body is a three part die-cast structure that has an electrical armature, a rectifier, and a voltage regulator encapsulated within it. Because the armature of the alternator is encapsulated within the die-cast body, it is completely watertight and protected from the environment. The stationary body is made from a material such as aluminum, magnesium, or thermoplastic that is not magnetically conductive. The rotor mounts on top of, and surrounds, the armature. The rotor is an extruded steel structure and it has permanent magnets encapsulated within grooves formed in the rotor.

The armature of the alternator is encapsulated within a die-cast body, and the permanent magnets are encapsulated within an extruded steel rotor. Therefore, the air gap between the armature and the magnets is largely determined by the casting of the body and the shape and size of the extruded steel rotor. Indeed, because the die-cast body is non magnetic, the casting, itself serve as an air gap. Only a minimal gap is present between the stationary and rotating portions of the alternator. This arrangement provides excellent dimensional stability for the air gap in the alternator and allows for optimal performance. Also, because of the excellent dimensional tolerances in the alternator, it is capable of operating at very high rotational speeds. It is anticipated that the rotor would spin at rotational speeds up to 22,000 RPM when the boat is traveling at 80 miles per hour.

Another advantage of the alternator's architecture is that no brushes or slip rings are required. The armature is located within the stationary body with the permanent magnets being mounted in the rotor. The permanent magnets do not require electrical excitation. Therefore, all of the electrical components are stationary and there is no requirement for transmitting power to the rotor. This is a major advantage for an alternator operating in an under-water environment where brushes and slip rings would be subject to problems and continual maintenance.

The mounting location of the alternator on the boat is also important to the function of the invention. A typical bass-style fishing boat uses an outboard motor. Outboard motors have a section called a lower end that extends downward beneath the surface of the water. The lower end supports the propeller and has a plane plate immediately above and forward of the propeller. When the boat is driven at cruising speed, the plane plate is at the surface of the water. The portion of the lower end that is beneath the plane plate is submerged when the boat is driven at cruising speed. The portion of the lower end that is above the plane plate is above the water when the boat is driven at cruising speed. The alternator of the present invention is intended to be mounted either from the bolts which attach the lower end to the outboard motor, or directly to the plane plate. However, the alternator is attached, it should be disposed underneath the plane plate so that it is immediately forward of the outboard motor's propeller. This has several positive effects. First of all, the alternator can extract maximum power by being immediately forward of the propeller where the ambient fluid current velocity is the highest. Also, the drag caused by the alternator will be applied at the centerline of the boat so that it will not effect the steering of the boat. Finally, the alternator is somewhat protected from hitting rocks and debris by being immediately adjacent to the propeller.

One feature of the present invention is the provision for efficient heat transfer from the rectifier and regulator to the water. The rectifier and regulator are installed in the die-cast stationary body of the alternator. These electronic components are in direct contact with the casting. This allows efficient convective heat transfer through the casting to the ambient water. The alternator generates significant amounts of power; as much as 60 to 80 Amps when the boat is traveling at full speed. If the batteries are fully charged, then this power is not needed. In that case, the regulator must be able to dump the power. The regulator dumps the excess power in the form of heat which is transferred through the alternator's body into the water. Because the maximum power is generated when the boat is at full speed, the ambient water will be moving at high velocity. This allows for excellent heat transfer into the water.

Another feature of the present invention is the provision for using the alternator with various voltages that may exist in the boat's battery system. It is contemplated that multiple sets of windings are used in the armature. The windings may be brought into or out of the electrical circuit through a manually operated switching device that is located within the die cast body. Typical battery systems for trolling motors operate at 12 Volts, 24 Volts, 36 Volts, or 48 Volts. Therefore, the switching device will allow the user to select the appropriate voltage for his boat's battery system.

The foregoing objects and advantages of the invention will be more fully understood from the following detailed description of the invention and from the accompanying drawings.

BRIEF DESCRIPTION OF THE DRAWINGS

FIG. 1 is a perspective view of a boat with a hydro-alternator according to the present invention.

FIG. 2 is a side view of the hydro-alternator of the present invention.

FIG. 3 is an end view of the hydro-alternator of the present invention.

FIG. 4 is an exploded view of the hydro-alternator of the present invention.

DETAILED DESCRIPTION OF THE INVENTION

Figure 5:
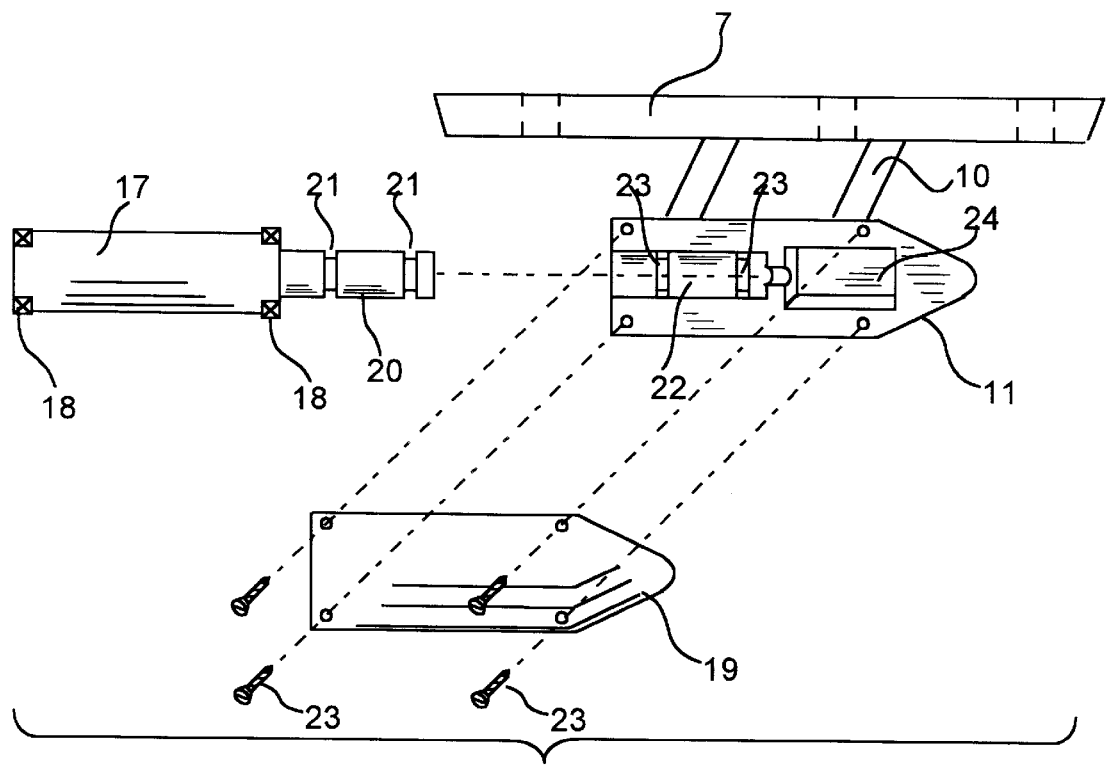
FIG. 5 is an exploded view of the stationary body of the hydro-alternator according to the present invention.

The hydro-alternator of the present invention is described herein for use on a bass-style fishing boat as shown in FIG. 1. Naturally, the hydro-alternator can be used on other types of boats. However, the design of the hydro-alternator is optimized for use on a bass fishing boat. Bass fishing boats are characterized by having a large gasoline powered motor that is used for getting from one location to another quickly, and a small electric trolling motor that is used for slowly trolling once at a fishing location.

FIG. 1 shows a boat 1 with an outboard motor 2 mounted on the aft end of the boat. The outboard motor 2 is a standard, gasoline powered outboard motor. The outboard motor 2 is operated from driver's seat 3. Outboard motor 2 has a propeller 4 that provides motive power for the boat 1. The outboard motor 2 also has a plane plate 5 on the motor's lower end 2a. The plane plate 5 is immediately above and forward of the propeller 4. The plane plate 5 serves several purposes in enhancing the performance of the outboard motor 2. A plane plate is a standard element of all commercially available outboard motors. The hydro-alternator 6 of the present invention is mounted to the outboard motor 2 via a bolted connection to either the plane plate 5 or the lower end of the motor 2. The hydro-alternator 6 bolts to the motor 2, either on the lower end 2a or the plane plate 5, via a bolt plate 7. Whether the hydro-alternator 6 is attached to the lower end 2a of the motor 2 or to the plane plate 5, it must be mounted so that it is situated underneath the plane plate 5. It is also situated so as to extend in the forward direction from the plane plate 5. This allows the hydro-alternator to be immediately forward of the propeller 4 while the boat is operating. The plane plate 5 is generally at the surface of the water when the boat is traveling at cruising speed. Therefore, the hydro-alternator 6 is immediately under the surface of the water at cruising speed.

The hydro-alternator 6 is shown in FIG. 2. The hydro-alternator 6 is constructed in two primary pieces, a stationary body 8 and a rotor 9. The stationary body 8 includes a bolt plate 7, struts 10, and a body 11. The bolt plate includes several bolt holes 12. The bolt holes are provided in several locations so as to allow the hydro-alternator to be installed on various sizes and designs of plane plates 5 or lower ends 2a of outboard motor 2. Struts 10 space the alternator below the plane plate 5 by a predetermined distance. Because the plane plate is located at the surface of the water during operation, the spacing of the alternator below the plane plate determines the depth underneath the water at which the alternator will be located.

The rotor 9 includes a propeller 13 which is made up of a plurality of replaceable blades 14 attached to a hub 15. The number of blades 14, as well as their shape, can be determined to give optimal performance of the alternator. The blades 14 should be designed so that the alternator will produce maximum power while creating minimal drag. In order to achieve this goal, it is desired that the blades 14 would be designed to cause the rotor 9 would spin at high speed. The exact design of the blades 14 does not form a part of the present invention and will not be described in further detail herein.

The frontal area of the alternator, as shown in FIG. 3, should be as small as possible. The drag force created by the alternator is proportional to its frontal area. Therefore, it is desired to minimize the size of the parts in the alternator. However, making the propeller 13 smaller will also result in less power being generated by the alternator. In order for the alternator to generate adequate levels of power, it is necessary for the rotor 9 to spin at high speed. Generally, the rotor speed is linearly proportional to the travel speed of the boat to which it is mounted. If the travel speed of the boat 1 doubles, the rotational speed of the rotor 9 will also double. The hydro-alternator is to be designed to turn at a rotational speed of 22,000 RPM when the travel speed of the boat is 80 mph.

Although the rotor speed is linearly proportional to the boat's travel speed, the power that is available to the rotor is proportional to the boat's travel speed cubed. So if the boat's travel speed doubles, the power available to it increases by a factor of eight. In order to extract the maximum possible amount of power from the water, it is necessary to maintain a consistently linear relationship between the alternator's rotor speed and the boat's travel speed. This is possible if the alternator is designed so that rotor torque is proportional to the rotor speed squared. A designer of ordinary skill in the art would know how to design the alternator to achieve this characteristic in the rotor.

The rotor 9 slides on top of the stationary body 8 as shown in FIG. 4. The rotor includes a hollow cylindrical body 16 that slides on top of an armature housing 17. The cylindrical body 16 is supported on armature housing 17 with bearings 18. The bearings 18 allow the cylindrical body 16 of the rotor 9 to rotate about the armature housing 17. Since the rotor 9 turns at high speed, the bearings 18 must be high speed, precision bearings. Also, at least one of the bearings 18 must be a thrust bearing in order to support thrust forces generated by the propeller 13.

The cylindrical body 16 of rotor 9 is preferably formed by extrusion with some final machining to ensure that the dimensions of the cylinder are accurate. The cylinder should be formed from a strong, rugged material that can accurately maintain dimensional tolerances. Also, the material in the cylindrical body 16 should be resistant to corrosion. The propeller 13, including the hub 15, is preferably formed as a separate part and joined to the cylindrical body 16 with a suitable method such as bolting or threading. The replaceable propeller 13, including the blades 14 and the hub 15, is preferably cast out of either stainless steel or aluminum.

The stationary body 8 is formed as three separate pieces as shown in FIG. 5. The stationary body consists of an armature housing piece 17, a main body piece 11, and a removable body section 19. All three pieces of the stationary body 8 are preferably formed by die-casting. It is important for the dimensions of the stationary body 8, especially the armature housing 17, to be dimensionally precise so that the rotor 9 will fit perfectly on the armature housing 17. The stationary body 8 should be formed from a strong, rugged material that will not corrode. Also, one of the most important features of the stationary body 8 is that it must be formed from a non-magnetic material. The armature of the alternator is encapsulated within the armature housing 17 and so the material of the stationary body 8 must be non-magnetic so as not to interfere with the magnetic field in the alternator.

The armature housing 17 is formed with an attachment protrusion 20. The attachment protrusion 20 includes a pair of grooves 21. The main body 11 includes a recessed portion 22 that matches the attachment protrusion 20 in size and shape. The recessed portion 22 in the main body 11 includes a pair of notches 23 that match grooves 21 in size and shape. The recessed portion 22 receives the attachment protrusion 20. The notches 23 mate with the grooves 21 to securely lock the attachment protrusion 20 into recessed portion 22. The removable body section 19 includes a recessed portion similar to element 22 in the main body 11. The recessed portions in the main body 11 and the removable body section 19 cooperate to securely hold the attachment protrusion 20 of the armature housing 17. The removable body section 19 fastens to the main body 11 with mounting screws 23 or any other suitable fastening method.

The wires for the armature are routed through the attachment protrusion 20. A variety of armature housings can be made available with different armature windings inside of them. In that manner, the user can select an armature to provide the alternator characteristics that are appropriate to their particular application. For instance, one armature may be appropriate for use on a high powered, high performance boat in order to minimize drag on the boat, whereas another armature may be more appropriate on a moderately powered boat in order to maximize electricity production. Also, if the armature becomes damaged and requires maintenance, it can be removed relatively easily and changed out for a new armature. It is also contemplated to include multiple sets of armature windings inside one armature housing 17. Each set of armature windings would produce a different voltage output from the alternator. The user could then adjust the alternator's output voltage to match the battery system on their boat. In that case, it would be necessary to open the body 11 by removing the removable body section 19 in order to gain access to the armature windings. The windings are then manually switched by disconnecting one set of windings and connecting another. The main body 11 and the removable body section 19 each include a cavity 24 that holds the alternator's electronic components such as the rectifier and regulator.

The stationary body 8 must be watertight when its three component pieces are assembled. Therefore, there is an O-ring between the armature housing 17 and the main body 11. Also, there is a gasket that is cut to the appropriate size and shape and placed between the main body 11 and the removable body section 19. Both the O-ring and the gasket must be made from strong durable material that is resistant to corrosion and dry rotting. The gasket is preferably made from Viton™ gasket material.

Figure 6:
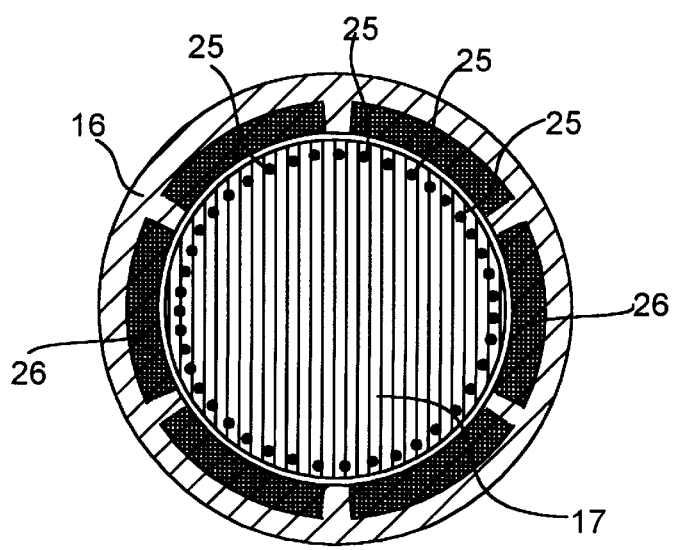
FIG. 6 is a cross-sectional view of the hydro-alternator of the present invention taken along lines 6—6 in FIG. 2.

A cross section of the alternator is shown in FIG. 6. The armature housing 17 is formed with wires 25 inside of it that form the windings of the alternator's armature. The cylindrical body 16 of the rotor 9 has slots machined into its inside surface. Permanent magnets 26 are inserted in the slots in the cylindrical body 16 and form the rotor portion of the alternator.

The armature housing 17 can be seen in FIG. 6 to be a solid die-cast piece. The windings 26 of the alternator's armature are embedded in the armature housing 17. The windings must be electrically insulated so that they will not short out through the body of the armature housing 17. If the stationary body is formed from a non-conductive material such as thermoplastic, then it will insulate the wires in the armature and they do not need their own insulation. Alternatively, the armature housing 17 could be formed as a hollow structure with the armature windings 25 affixed to the inside surface of the housing 17.

All alternators have an air gap between the magnets and the windings in the armature. Maintaining a consistent air gap is a major design goal in every alternator. Because of the high speeds at which the rotor turns, maintaining a consistent air gap is a particularly important aspect of the present invention. The air gap between the windings 25 of the armature and the permanent magnets 26 of the rotor is partially filled with the material of the die-cast armature housing 17. Therefore, the portion of the air gap that is actually occupied by air is relatively small. Since there is relatively little physical gap in the air gap, most of the air gap being occupied by the armature housing 17, the dimension of the total air gap is very stable, even at high rotor speed.

The magnets 26 used in the rotor 9 are permanent magnets. Preferably, the magnets 26 should be rare earth Neodynium Iron Boron magnets. Because they are permanent magnets, they do not require brushes or slip rings as required by the electromagnets used in conventional alternators. Because brushes and slip rings are not required, and because the armature windings 25 are encapsulated in the armature housing 17, there are no electrical components that are exposed to the water. The O-ring and gasket used during the assembly of the stationary body 8 are the only watertight seals that are required in the alternator. Reduction in the number of seals substantially improves the reliability and reduces the maintenance of the alternator.

Figure 7:
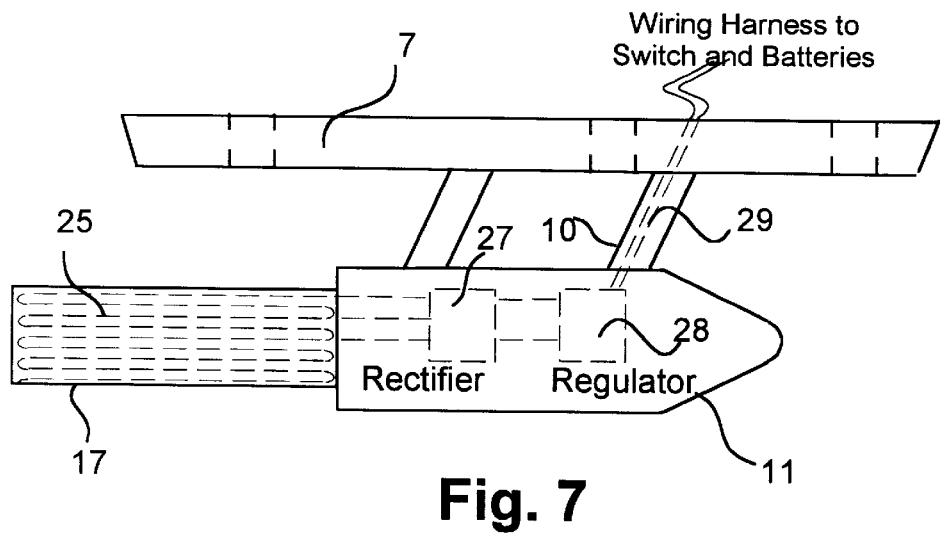
FIG. 7 is a schematic view of a portion of the hydro-alternator of the present invention showing the location of various electrical components.

FIG. 7 schematically shows the stationary body 8 along with all the components that are encapsulated within it. The windings of the armature 19 can be seen to be encapsulated in the armature housing 17. In the main body 11, there are lead wires that go from the armature to an electronic rectifier 27 and regulator 28. From the regulator 28 there is a wiring harness 29 that extends through one of the struts 10, through the bolt plate 7, and on to a switch and the batteries.

The rectifier 27 converts 3 phase alternating current, as produced by the alternator, into single phase direct current, as required by the batteries. The regulator 28 maintains the electrical power at the required voltage. The regulator 28 also monitors the charge status of the batteries and limits the power delivered to the batteries when they are fully charged. Both the rectifier 27 and the regulator 28 generate heat. Particularly the regulator 28 generates a lot of heat when the batteries are fully charged. A permanent magnet alternator must always have a load applied to it or the high voltage from an open circuit would damage the rectifier. When the batteries are fully charged, the regulator 28 does not deliver any power to the batteries and so it must dissipate all of the power produced in the form of heat.

In order to facilitate heat transfer from the rectifier 27 and regulator 28, those electronic components are encapsulated in the stationary body 8. The rectifier 27 and regulator 28 are mounted inside of cavity 24 in direct contact with the material of the die-cast body 8 so that conductive heat transfer is efficient. The water passing over the outside of the stationary body 8 facilitates convective heat transfer to the water. Therefore heat transfer is very efficient from the electronic components which are subject to self-heating to the surrounding water. Maximum heat is generated when the boat is travelling at high speed and a lot of power is being generated by the alternator. Fortunately, the convective heat transfer from the stationary body 8 to the water is most effective at high travel speeds. In order to facilitate heat transfer, it is preferred that the die-cast body 8 is formed from a material with good conductive heat transfer properties.

Figure 8:
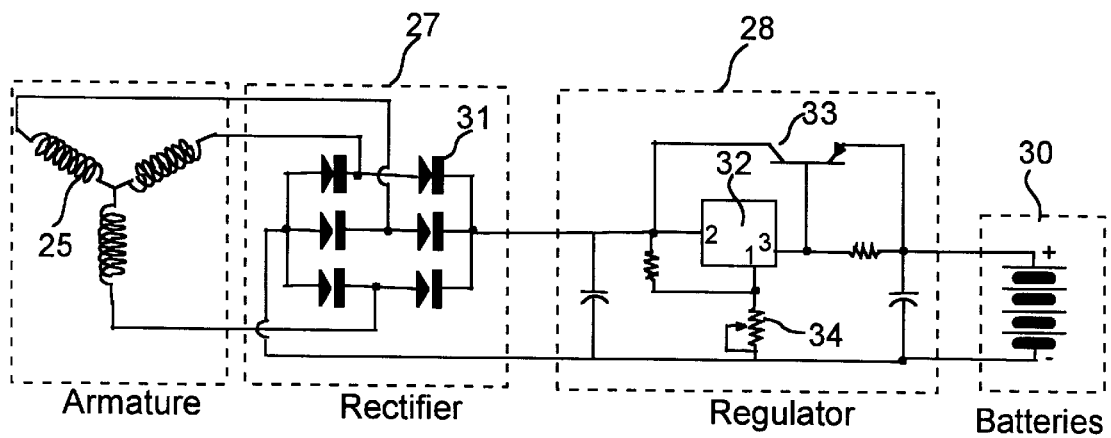
FIG. 8 is a circuit diagram showing the electrical connection of the hydro-alternator of the present invention.

The electrical aspects of the hydro-alternator are shown schematically in FIG. 8. The armature 25 can be seen to be a three phase design with a Y configuration. Three wires connect the armature to a rectifier 27. The rectifier 27 converts three phase alternating current from the armature in to single phase direct current power. From the rectifier 27 there are two wires leading to a voltage regulator 28. The voltage regulator 28 provides the proper voltage to the batteries 30. When the batteries are fully charged, the regulator 28 does not provide any power to the batteries 30.

The rectifier 27 consists of six diodes 31 arranged to convert the three phase AC electricity from the alternator into single phase DC electricity. Details of the diodes, such as their size, are design choices that one of ordinary skill in the art would be able to figure out.

The regulator 28 consists of an optical comparitor chip 32 that monitors the voltage in the battery 30. When the battery voltage reaches a set level, a triac 33 is fired and the current from the alternator is diverted through the triac 33 instead of being delivered to the battery 30. A suitable triac 33 would be the TI-220 package. The triac 33 must absorb all of the power generated by the alternator at times when the battery is fully charged. During those times, it must dissipate a lot of heat. For this reason, the triac 33 is in direct contact with the material of the stationary body 8.

The voltage that the regulator 28 provides to the battery 30 is adjusted with a potentiometer 34. The potentiometer 34 can be used to fine-tune the charging level of the battery 30. Beside the fine-tuning of voltage that the potentiometer 34 provides, the overall charging voltage is determined by the optical comparitor chip 32. It is contemplated that the optical comparitor chip 32 would be adjustable or replaceable to provide a user selectable voltage to the battery 30. The optical comparitor chip 32 should be adjustable or replaceable to provide charging to battery systems at 12 V, 24 V, 36 V, or 48 V.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

We claim:

1. Boat mounted electricity generation apparatus comprising:

a boat, a hydro-alternator fixedly mounted on said boat wherein said hydro-alternator comprises:

a) a body made of aluminum, magnesium, or thermoplastic, fixedly mounted to said boat, said body having a longitudinal axis, b) an electrical armature encapsulated within said body, said armature having wires that are oriented parallel to said longitudinal axis of said body, c) a rotor including a plurality of permanent magnets, said rotor mounted about said body concentric with said longitudinal axis for rotation thereabout, said rotor surrounding the electrical armature with said plurality of permanent magnets radially spaced from said armature by a predetermined distance, and d) a propeller fixedly mounted on said rotor for rotation therewith.

2. The hydro-alternator of claim 1 further comprising an outboard motor mounted on a rear transom of said boat wherein said outboard motor comprises a propeller, and a substantially horizontal plane plate disposed above said propeller, and wherein said hydro-alternator is fixedly mounted to said outboard motor so that it is disposed below said plane plate and in front of said propeller.

3. The hydro-alternator of claim 2 wherein said plane plate comprises a top surface and a bottom surface and said body is bolted to the bottom surface of said plane plate.

4. The hydro-alternator of claim 2 wherein said motor further comprises a lower end housing that supports said plane plate and said propeller, and wherein said body is bolted to said lower end housing.

5. The hydro-alternator of claim 1 further comprising:
   a battery on said boat, said battery being electrically connected to said armature of said hydro-alternator,
   an electrical rectifier for converting alternating current electricity from said alternator into direct current electricity that is applied to said battery, and
   an electrical regulator that monitors the charge of said battery and that limits the electrical current delivered to said battery when the battery is sufficiently charged,
   wherein said electrical rectifier and said electrical regulator are mounted in said body of said hydro-alternator.

6. The hydro-alternator of claim 5 wherein said electrical rectifier and said electrical regulator are in direct contact with the material of said body of said hydro-alternator, thereby facilitating heat transfer from said rectifier and said regulator to water in which the hydro-alternator is immersed.

7. They hydro-alternator of claim 6 wherein said body of said hydro-alternator is made from a metal, whereby the heat transfer through said body is high.

8. The hydro-alternator of claim 7 wherein said body is die-cast out of metal with said electrical armature, said electrical rectifier, and said electrical regulator are encapsulated within said body.

9. The hydro-alternator of claim 8 wherein said body is die-cast out of aluminum.

10. The hydro-alternator of claim 1 wherein said armature comprises a winding wire encapsulated within said body and said permanent magnets are radially spaced from said winding wire by a predetermined gap, wherein the size of said predetermined gap is fixed by the location at which said winding wire is encapsulated within said body.

11. The hydro-alternator of claim 10 wherein a first portion of said predetermined gap is occupied by material from said body and a second portion of said predetermined gap is occupied by an air space.

12. The hydro-alternator of claim 11 wherein said first portion of said predetermined gap is smaller than said second portion of said predetermined gap.

13. The hydro-alternator of claim 1 wherein said rotor rotates about said longitudinal axis at a rotational speed that is proportional to the travel speed of said boat.

14. The hydro-alternator of claim 13 wherein the rotational speed of said rotor is at least 10,000 revolutions per minute when the travel speed of said boat is 80 miles per hour.

15. The hydro-alternator of claim 14 wherein the power output of said alternator is substantially proportional to the travel speed of said boat cubed, and wherein the power output of said alternator is at least 60 Watts when the travel speed of said boat is 80 miles per hour.

16. The hydro-alternator of claim 1 further comprising:
   a battery on said boat, said battery being electrically connected to said armature of said hydro-alternator,
   wherein the voltage at which said hydro-alternator delivers power to said battery is selectable between a plurality of voltages.

17. The hydro-alternator of claim 16 wherein the voltage at which said hydro-alternator delivers power to said battery is selectable between 12 V, 24 V, 36 V, and 48 V.

18. The hydro-alternator of claim 1 wherein said permanent magnets are neodynium magnets.

19. The hydro-alternator of claim 1 wherein said electrical armature is encapsulated within an armature housing, and wherein said armature housing is removable from said body.

20. The hydro-alternator of claim 1 further comprising a plurality of electrical armatures encapsulated within said body, each said electrical armature having unique electrical characteristics, wherein each of said plurality of electrical armatures can be selectively connected or disconnected from the circuit of said hydro-alternator to achieve the desired electrical characteristics in said hydro-alternator.

* * * * *